United States Patent [19]

Hoekstra

[11] 3,863,204

[45] Jan. 28, 1975

[54] INTERLOCK FOR AIRCRAFT TAKE-OFF SAFETY MONITOR

[76] Inventor: Harold D. Hoekstra, 253 N. Columbus, Arlington, Va. 22203

[22] Filed: Nov. 15, 1973

[21] Appl. No.: 415,930

[52] U.S. Cl.......... 340/27 R, 235/92 DE, 340/365 R
[51] Int. Cl................................................. G08g 5/02
[58] Field of Search...... 340/27 R, 149 A; 73/178 T

[56] References Cited
UNITED STATES PATENTS 3,213,683  10/1965  Bunze............................... 73/178 T
3,686,630  8/1972  Zuboy............................. 340/149 A

*Primary Examiner*—Thomas B. Habecker
*Attorney, Agent, or Firm*—Shlesinger, Arkwright, Garvey & Dinsmore

[57] ABSTRACT

The invention relates to an interlock between a ground based aircraft performance data storage system and an aircraft based indicator which monitors the performance of the aircraft during take-off and provides an indication of whether a safe take-off can be achieved at any given point in time. The interlock includes a punch-coded data card or the like onto which data determinative of acceptable levels of aircraft performance during take-off may be placed, stored and physically transported to the aircraft. This data is dependent on specific airport conditions, the particular type of aircraft, weather conditions, etc., and is computed by reference to such sources as the aircraft flight manual, a ground-based data bank and computer, meterological reports and data sheets for a specific airport. The aircraft is provided with an apparatus for receiving the record, decoding the data thereon to provide either an electrical or mechanical output and then utilizing this output to set the acceptable levels of performance into the take-off monitor.

11 Claims, 5 Drawing Figures

Patented Jan. 28, 1975  3,863,204

Patented Jan. 28, 1975

INTERLOCK FOR AIRCRAFT TAKE-OFF SAFETY MONITOR

BACKGROUND OF THE INVENTION

In order for a safe take-off to be accomplished, the aircraft must attain a certain speed by the time it has rolled a given distance down the runway. Conversely, for any given point along the runway, there is a certain maximum speed from which the aircraft may safely be decelerated to a full stop within the remaining runway distance. The common denomination for the maximum aircraft ground speed from which take-off may be discontinued is the $V_1$ speed or abort speed, and the distance along the runway necessary to accelerate to the $V_1$ speed is known as the $V_1$ distance.

Another performance factor which comes into play during take-off is the rotation speed commonly referred to as $V_R$ speed. This is the speed at which the aircraft is rotated about a spanwise axis to produce lift-off.

Under current practice, the $V_1$ and $V_R$ speeds as well as the $V_1$ distance are established by reference to the particular aircraft flight manual, tables or an electronic data bank. These values are written on a take-off data card which is carried to the aircraft by the flight crew for reference thereto during take-off. During take-off the crew may either repeatedly refer to the data card or mark the appropriate $V_1$ and $V_R$ speeds on the air speed indicator itself so that the actual aircraft performance may be compared to the desired performance at a glance.

Improvements in means for monitoring the aircraft performance during take-off and relating the attainment or non-attainment of a safe level of performance are taught by my previously granted U.S. Pat. Nos. 3,174,710 and 2,922,982, which are hereby expressly incorporated by reference.

The aforementioned improvements relate to means whereby the flight crew may continuously monitor the aircraft speed and distance relationship during take-off and be advised whether or not the relationship is of such a character that a safe take-off may be accomplished. The improvements, known as aircraft take-off safety indicators, include means for setting the proper $V_1$ and $V_2$ (or $V_R$) speeds as well as the appropriate $V_1$ distance into the device. As the take-off roll progresses, the device continuously compares the actual aircraft speed and distance relationship with the $V_1$, $V_2$ (or $V_R$) velocities and $V_1$ distance values. The crew may be apprised of the take-off performance by either a quantitative indication showing the actual performance versus desired performance or by a "more-than-safe" versus "less-than-safe" indication. Further explanation of this type of take-off safety indicator may be had by reference to the aforementioned patents.

A difficulty with the prior art take-off safety indicators lies in the fact that the $V_1$ and $V_R$ speeds and the $V_1$ distance must be set into the device manually by the flight crew. Not only is such a procedure time consuming, but the necessity for manual settings increases the chances for inaccuracy resulting from human error.

In addition to indicating to the flight crew whether or not a safe take-off can be achieved, it is often desirable to automatically indicate the proper settings of various aircraft controls during take-off. A problem which is becoming increasingly prevelent is that of excessive engine noise during take-off from airports located in densely populated areas. In order to maintain the engine noise below a given level, the throttle could be provided with an indicator showing or a stop limiting the maximum permissible setting during take-off. As was the problem with the take-off safety indicator, however, the setting of the control indicator requires the intervention of a crew member thereby increasing the chances for human error as well as increasing the amount of time necessary to accomplish the required preflight procedures.

OBJECTS OF THE INVENTION

It is, therefore, an object of this invention to provide an interlock for a take-off safety monitor wherein the acceptable or safe levels of aircraft take-off performance may be established on the ground and then automatically set into the monitor with only minimum action by the flight crew thereby decreasing the chance for an inaccurate setting due to human error.

It is a further object of this invention to provide an interlock for a take-off safety monitor which rapidly and accurately sets the acceptable levels of aircraft take-off performance into the monitor without appreciably increasing the time for performance of the preflight procedures by the flight crew.

It is another object of this invention to provide an interlock for a take-off safety monitor which automatically indicates or fixes the proper setting of various aircraft controls without the necessity for direct intervention by the flight crew.

A still further object of this invention is to provide an interlock for a take-off safety monitor which can be integrated with existing monitors without the necessity for substantial modification to them.

These and other objects will become apparent upon a reading of the specification with reference to the appropriate drawings.

SUMMARY OF THE INVENTION

The invention resides in the combination of an interlock with an aircraft take-off safety monitor, the latter including means for indicating the attainment or non-attainment of safe levels of one or more take-off performance criteria and adjustable means for pre-setting into the monitor data determinative of the value of at least one of the levels. The interlock means comprises record means for storing the data, actuate means operatively connected to the program means for adjusting same to set the data into the monitor upon the reception of the data by the actuate means and data transfer means associated with the actuate means for receiving the record means and transferring the data to the actuate means.

Figure 1:
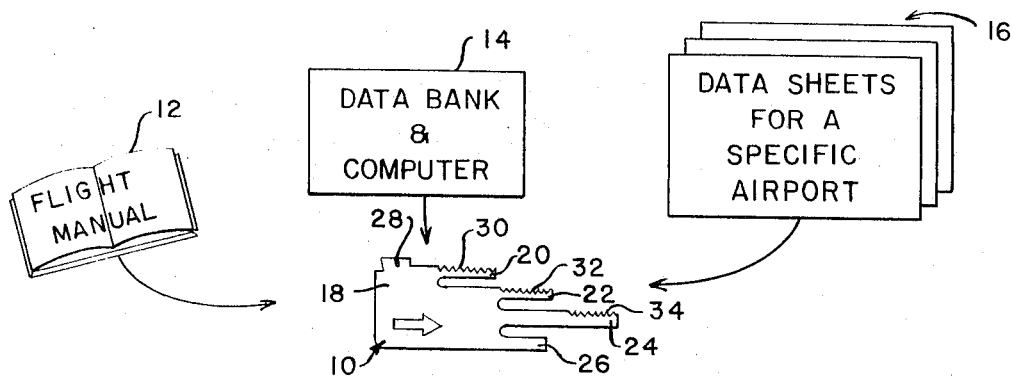
FIG. 1 is a symbolic representation of various data inputs which determine the proper coding of the key forming a portion of one embodiment of the present invention.

DETAILED DESCRIPTION OF THE EMBODIMENTS OF THE INVENTION ILLUSTRATED IN THE DRAWINGS

FIGS. 1 THROUGH 4

Referring to FIG. 1, there is illustrated a key or data card 10 which may be properly coded by the ground dispatch crew from information received from such sources as the aircraft flight manual 12, a ground-based data bank computer 14 and data sheets 16 for a specific airport. The key 10 is preferably made of a material which may be easily cut yet retain its shape under conditions of normal use. Some examples of appropriate materials would be thermoplastic resins, very stiff cardboard or thin sheets of metal.

Figure 2:
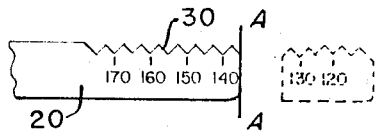
FIG. 2 is an enlarged fragmentary view of the properly coded key forming a part of the present invention.

The key 10 is preferably in the form of a thin card and comprises a base portion 18, a series of parallel fingers 20, 22, 24 and 26 extending from base portion 18 and a stop tab 28. Fingers 20, 22, and 24 have sets of teeth 30, 32 and 34, respectively, cut into their upper edges to form a plurality of racks and are provided with appropriate indicia as shown in FIG. 2.

Figure 3:
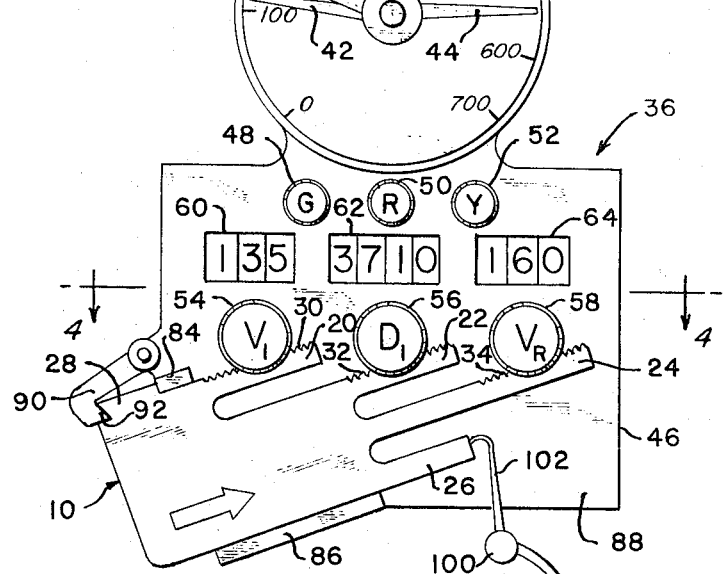
FIG. 3 is a front elevational view of one embodiment of the present invention showing the key of FIG. 1 inserted in a take-off safety monitor.

A take-off safety monitor 36, as described in the aforementioned U.S. Pat. No. 2,922,982, is illustrated in FIG. 3. Monitor 36 includes an air speed indicator 38 having an air speed indicating hand 40 as well as a minimum take-off speed or $V_1$ speed hand 42 and the usual maximum limiting air speed hand 44. A housing 46 for the take-off safety monitor 36 includes color coded indicator lights 48, 50 and 52 which indicate more-than-safe, less-than-safe and minimum-safe take-off performance conditions. Adjustment knobs 54, 56 and 58 mounted on the face of housing 46 permit the appropriate safe levels for $V_1$ speed, $V_1$ distance $V_R$ speed, respectively, to be set into the monitor 36 in the manner set forth in the aforementioned U.S. Pat. No. 2,922,982. Veeder-type counters 60, 62 and 64 are driven by knobs 54, 56 and 58 to quantitatively indicate the $V_1$ speed, $V_1$ distance and $V_R$ speed that have been set into the take-off safety monitor 36.

The adjustment knobs 54, 56 and 58 are connected to the appropriate pre-setting means (not shown) on the take-off safety monitor mechanism by means of shafts 66, 68 and 70. Clock-type springs 72, 74 and 76 are connected to shafts 66, 68 and 70, and urge shafts 66, 68 and 70, as well as adjustment knobs 54, 56 and 58, to rotate in a clockwise direction until such time as counters 60, 62 and 64 indicate that maximum values for the $V_1$ and $V_R$ velocities and the $V_1$ distance have been set into the monitor 36. Pinions 78, 80 and 82 are rigidly connected to shafts 66, 68 and 70, respectively, and are positioned such that they cooperate with key 10 to rotate shafts 66, 68 and 70 when it is inserted between guides 84 and 86 which project outwardly from the face 88 of housing 46. A latch 90, which is pivotally connected to housing 46 locks key 10 in position by engaging the rear edge 92 of stop tab 28.

A synchro or other servo mechanism 94 and an indicator arm or stop 96 rotated thereby is mounted in close proximity to the thrust lever or throttle 98 such that arm 96 rotates co-axially with lever 98. A second synchro 100 and the arm 102 rotated thereby is mounted on or near housing 46 such that it may be displaced by finger 26 when key 10 is inserted between guides 84 and 86. An appropriate electrical cable 104 connects synchros 94 and 100 such that a given rotational displacement of arm 102 will cause a corresponding rotational displacement of indicator arm 96.

The device operates as follows:

A short time before the aircraft is scheduled to depart, the ground dispatch crew accumulates data representing the existing weather conditions, the aircraft load, etc., and by consulting the flight manual 12 for the particular aircraft, the data sheets 16 which contain information relating to the characteristics of the specific airport and the airport data bank and computer, if available, determine the proper $V_1$ and $V_R$ speeds and $V_1$ distance for the particular aircraft under the existing conditions. A determination will also be made as to the correct or maximum setting of the throttle 98. The fingers 20, 22, 24 and 26 of the uncoded key 10 are then cut to an appropriate length by reference to the indicia marked thereon. For example, if the weather conditions, flight manual 12, etc., indicate that the safe $V_1$ speed for the aircraft is 135 knots, finger 20 would be severed along the line indicated by line A—A. Alternatively, the un-coded key 10 could be placed in an adjustable die or the like which would automatically cut the fingers 20, 22, 24 and 26 to their proper lengths after being pre-set in accordance with the appropriate $V_1$ and $V_R$ speeds, $V_1$ distance and throttle setting.

After the key 10 has been coded with the proper performance levels, it is carried to the aircraft by the flight crew and inserted into take-off monitor 36 by sliding it between guides 84 and 86 until such time as stop tab 28 engages guide 84. Latch 90 will then drop behind stop tab 28 to lock the key 10 in position during take-off. As key 10 is inserted between guides 84 and 86, racks 30, 32 and 34 engage pinions 78, 80 and 82, respectively, to rotate shafts 66, 68 and 70 against the force of springs 72, 74 and 76. The extent of rotation of shafts 66, 68 and 70 and the corresponding values of the $V_1$ speed, $V_1$ distance and $V_R$ speed set into the monitor 36 are dependent on the length of fingers 20, 22 and 24. Specifically, the longer fingers will rotate their corresponding knobs to a low value whereas the shorter fingers will rotate their corresponding knobs relatively little from the maximum setting. In this manner, the $V_1$, $V_R$ and $V_1$ distance values determined by the ground dispatch crew are automatically set into the take-off safety monitor without the necessity for the flight crew to manually set each of the adjustment knobs. Not only is the time required for the accomplishment of the pre-flight procedures shortened but the chances for an inaccurate setting to be made due to human error is substantially lessened.

Depending on such factors as weather conditions, population density in the area surrounding the airport, etc., it may be desirable to limit the maximum throttle setting during take-off. To indicate to the pilot the maximum permissible setting, finger 26 is cut to the proper length by the ground dispatch crew. As key 10 is inserted into take-off monitor 36, finger 26 will engage arm 102 and rotate it to a position dependent on the length to which it was cut. Synchros 100 and 94 are connected by electrical cable 104 in such a manner that the rotation of arm 102 through a given arc will cause indicator or stop 96 to be rotated through an equal or proportional arc. For example, if the desired maximum setting for throttle 98 is 30° off zero, finger 26 will be cut to a length which will rotate arm 102 through 30° or through an arc which is proportional to a 30° rotation of indicator 96. It should be noted that finger 26 could be utilized for indicating the proper setting of flap controls or other aircraft controls rather than the throttle setting. Also, key 10 could be provided with additional fingers for simultaneously indicating the proper setting of any number of the aircraft controls.

When the proper $V_1$, $V_R$, $V_1$ distance and throttle settings have been set into take-off safety monitor 36, the flight crew will be apprised of the actual performance of the aircraft during take-off in the manner described in the aforementioned U.S. Pat. Nos. 2,922,982 and 3,174,710.

FIG. 5

Figure 4:
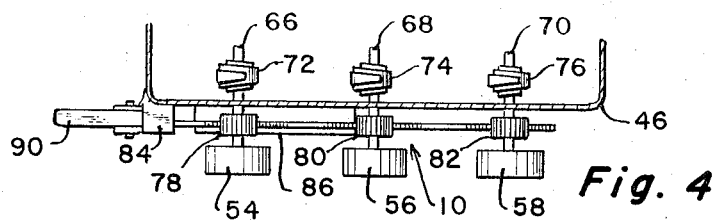
FIG. 4 is a fragmentary sectional view of FIG. 3 taken along line 4—4 and viewed in the direction of the arrows.
Figure 5:
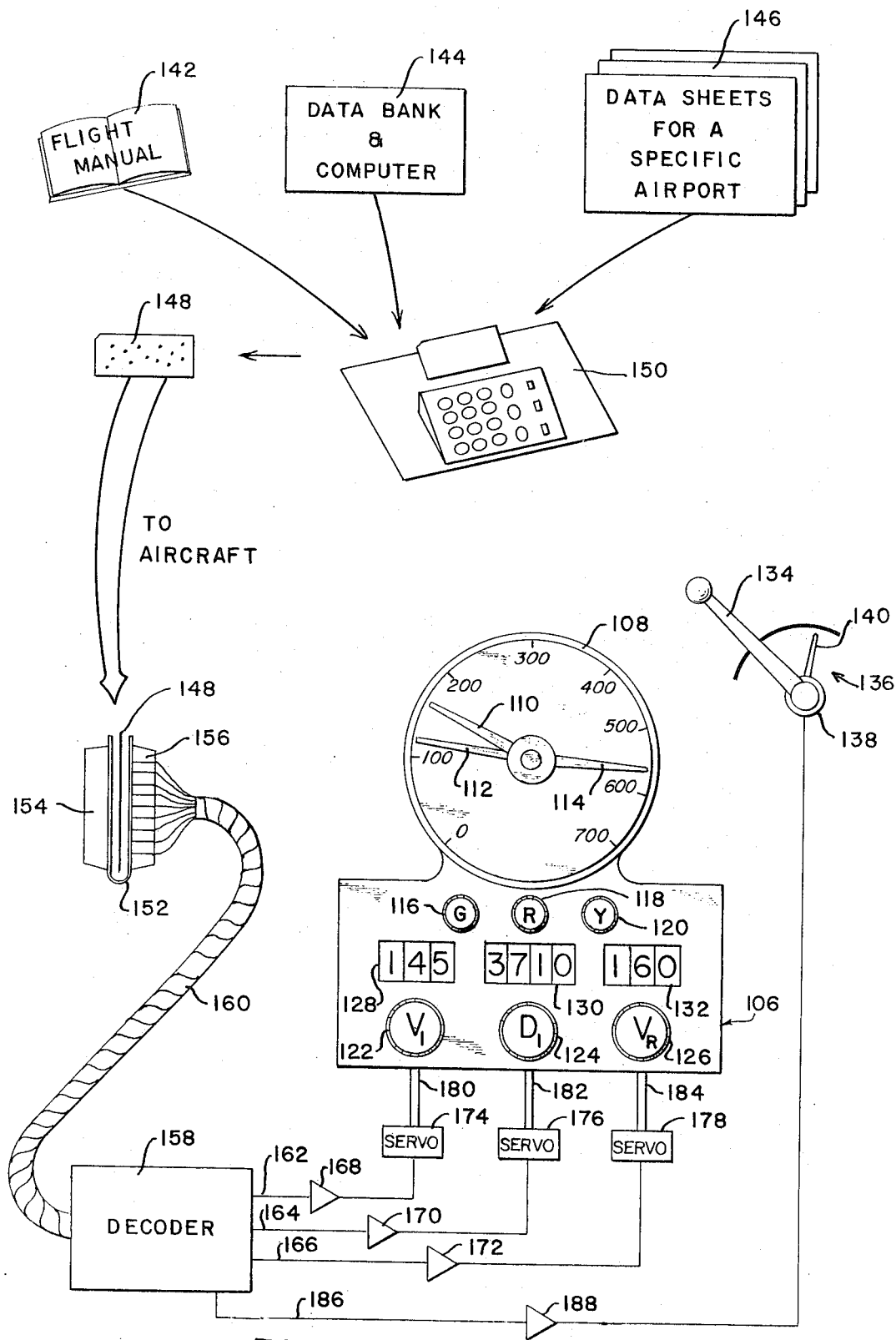
FIG. 5 is a diagrammatic representation of another embodiment of the present invention.

In addition to the mechanical embodiment illustrated in FIGS. 1 through 4, the take-off safety monitor could be programmed by the electrical means illustrated in FIG. 5.

Take-off safety monitor 106 is essentially identical to the one shown in FIGS. 3 and 4 and very similar to that described in U.S. Pat. No. 2,922,982. It includes an air speed indicator 108 including a movable pointer 110, a minimum take-off speed indicator 112, a maximum air speed indicator 114, indicator lights 116, 118, and 120, $V_1$ speed, $V_1$ distance and $V_R$ speed adjusting knobs 122, 124 and 126, respectively, and counters 128, 130 and 132 which indicate the appropriate values set into the monitor 106 by knobs 122, 124 and 126.

The aircraft throttle control 134 is provided with an indicating mechanism 136 which includes a servomotor or other servo mechanism 138 and a pointer or indicator 140 rotated thereby dependent on the electrical signal received by the servomotor 138.

Information regarding the existing weather conditions, aircraft load, etc., are utilized in conjunction with the aircraft flight manual 142, the airport data bank and computer 144, and the data sheets 146 to determine the proper $V_1$, $V_1$ distance, $V_R$ and throttle setting values. The last mentioned values are then punched onto a standard computer card 148 by key punch apparatus 150. Alternatively, the data bank and computer 144 could be directly linked to the card punch apparatus 150 to thereby automatically punch the proper settings onto computer card 148 dependent on the weather conditions, aircraft characteristics, aircraft load, airport conditions, etc., programmed into the computer.

The computer card 148 is carried to the aircraft by the flight crew and placed in a receiver 152. Light from light source 154 passes through the code-positioned apertures in card 148 to be received by photocell array 156. The coded light pattern received by photocell array 156 is converted into electrical signals which are introduced into decoder 158 through electrical cable 160. Characteristically, the input into decoder 158 from photocell array 156 is digitally coded and is converted thereby to a plurality of analog signals, one for each of the adjusting knobs 122, 124 and 126 as well as servo mechanism 138.

The electrical signals for adjusting knobs 122, 124 and 126 are placed on cables 162, 164 and 166 and amplified by amplifiers 168, 170 and 172. The amplified signals are then fed into servomotors 174, 176 and 178 causing the servomotor output shafts 180, 182 and 184 to be rotated to a degree determined by the individual signals on lines 162, 164, and 166. The shafts 180, 182 and 184 are connected through appropriate gearing (not shown) to adjusting knobs 122, 124 and 126 or their respective shafts (not shown) to thereby set into the monitor 106 the pre-determined safe levels of $V_1$ and $V_R$ speeds and $V_1$ distance. It should be noted that stepping motors or other appropriate servo mechanisms could be substituted for servomotors 174, 176 and 178.

An additional decoded analog signal is placed on electrical cable 186, amplified by amplifier 188 and fed to servomotor 138. Depending on the signal on line 186, indicator 140 will be rotated to a certain position thereby indicating or limiting the maximum or correct setting of throttle 134.

It should be noted that, rather than converting a digitally coded input signal to an analog output signal, decoder 158 may retain the output signal from photocell array 156 in its digital form and merely convert it into a plurality of digital pulse trains or the like which will cause servomotors 174, 176 and 178 and 138 to rotate their respective output shafts 180, 182 and 184 and indicator 140 to the appropriate degree. Furthermore, should the aircraft take-off safety monitor be of the electrical type rather than the mechanical type disclosed in U.S. Pat. Nos. 3,174,710 and 2,922,982, the electrical signal from decoder 58 could be fed directly into the monitor without the need for converting the electrical signal into a mechanical output.

While this invention has been described as having a preferred design, it will be understood that it is capable of further modification. This application is therefore, intended to cover any variations, uses or adaptations of the invention following the general principles thereof and including such departures from the present disclosure as come within known or customary practice in the art to which the invention pertains, and as may be applied to the essential features hereinbefore set forth and fall within the scope of this invention or the limits of the appended claims.

I claim:

1. In combination with an aircraft take-off safety monitor including means for storing desired values of at least one aircraft performance variable as a function of a different aircraft performance variable, means for comparing the actual said aircraft performance variable with the stored said aircraft performance variable, and means comprising one or more manually adjustable controls for setting into said storage means data at least partially determinative of said desired values of said aircraft performance variable:
   a. portable record means for storing said data,
   b. data transfer means responsive to said record means for transferring said data from said record means to said storing means by adjusting said controls to set said data into said storing means, and
   c. receiver means for receiving said record means and positioning same to permit actuation of said data transfer means.

2. The combination of claim 1 and wherein said record means is physically transportable.

3. The combination of claim 1 and including means for placing said data on said record means.

4. The combination of claim 3 and wherein:
   a. said record means comprises a punchable card, and b. said means for placing data includes a card punching apparatus.

5. The combination of claim 1 and wherein:
a. said record means comprises an object, the light transmitting properties of which may be selectively altered,
b. said data transfer means includes a source of light and an array of light responsive devices.

6. The combination of claim 5 and wherein said receiver means includes means for supporting said object between said source of light and said array of light responsive devices.

7. The combination of claim 1 and wherein said data transfer means includes a servomechanism mechanically connected to one of said controls.

8. The combination of claim 1 and wherein:
a. said take-off safety monitor includes adjustable indicator means for directly indicating a given setting of one of the aircraft controls,
b. said record means includes means for storing data determinative of said setting, and
c. said data transfer means includes means responsive to said record means for adjusting said adjustable indicator means to indicate said given setting.

9. The combination of claim 8 and wherein said aircraft control is a throttle control lever.

10. The combination of claim 1 and including:
a. ground based means for storing said data,
b. means responsive to said ground based storing means for impressing said data on said record.

11. The combination of claim 10 and wherein:
a. said take-off safety monitor includes adjustable indicator means for directly indicating a given setting of one of the aircraft controls,
b. said record means includes means for storing data determinative of said setting,
c. said ground based storing means includes means for storing said last mentioned data,
d. said means responsive to said ground based storing means includes means for impressing said last mentioned data on said record means, and
e. said data transfer means includes means responsive to said record means for adjusting said adjustable indicator means to indicate said setting.

* * * * *